United States Patent [19]
Coughran, Jr.

[11] 3,818,551
[45] June 25, 1974

[54] QUICK HITCH ASSEMBLY
[75] Inventor: Samuel J. Coughran, Jr., Cedartown, Ga.
[73] Assignee: Rome Industries, Cedartown, Ga.
[22] Filed: Feb. 27, 1973
[21] Appl. No.: 336,177

[52] U.S. Cl............................ 24/243 FM, 214/145
[51] Int. Cl............................................. A44b 21/00
[58] Field of Search ...... 24/243 K, 243 M, 243 FM, 24/68 T, 263 B; 214/620, 145; 172/272, 274

[56] References Cited
UNITED STATES PATENTS
3,172,686   3/1965   Beard............................ 172/272 X
3,417,886   12/1968   Stuart............................... 214/145
FOREIGN PATENTS OR APPLICATIONS
1,431,698   1/1969   Germany........................... 214/620
216,635   10/1967   Sweden............................ 214/145

Primary Examiner—Donald A. Griffin
Attorney, Agent, or Firm—Newton, Hopkins & Ormsby

[57] ABSTRACT

A quick hitch assembly for attaching a vehicle to a work implement includes a pair of latch members and means for extending the quick hitch assembly to engage the latch members in upwardly facing recesses of a hook assembly mounted on the work implement. In a first embodiment, the quick hitch assembly is manually extended by providing a swivel member pivoted on an upper frame member which is engaged in downwardly facing recesses of the hook assembly, the swivel member being connected to an over-center linkage whereby pivoting of the swivel member causes extension of the quick hitch assembly. In a second embodiment, hydraulic means are provided for extending the quick hitch assembly. In both embodiments, a guide housing is provided for the latching members and a shoulder of the guide housing is adapted to engage blocks in the upwardly facing recesses so that downward load will be taken up by the blocks, diverting any down load from the latching members.

14 Claims, 7 Drawing Figures

QUICK HITCH ASSEMBLY

BACKGROUND OF THE INVENTION

This invention relates to means to attaching vehicles to work implements and, more particularly, relates to a quick hitch assembly having this function.

Tractors and other work vehicles are frequently coupled to work implements, such as snow plows, earth moving blades, and buckets. Since the ease and rapidity of attachment of the tractor to the work implement greatly affects its utility and economy, there have been a number of proposals in the prior art for quick hitch assemblies for rapidly attaching the vehicle to the work implement. These prior efforts have been subject to a number of drawbacks. For example, there has been a tendency to employ complex mechanical and hydraulic systems for effecting the quick hitch attachment. In Stewart U.S. Pat. No. 3,417,886, for example, a quick hitch assembly is engaged with an attachment assembly on the work implement with the objective of aligning a hole on the quick hitch assembly with a hole on the attachment assembly. After these holes are aligned, hydraulic means are employed for driving pins through the aligned holes in order to latch the work implement to the vehicle. Prior art quick hitch assemblies also have been characterized by the disadvantage of load stresses on the latching mechanism.

SUMMARY OF THE INVENTION

It is accordingly the principal object of the invention to provide an improved quick hitch assembly which avoids the aforementioned drawbacks of the prior art.

More specifically, it is an object of the invention to provide a quick hitch assembly which may, in one embodiment, be implemented by a simple manually actuated linkage. In a second embodiment, a simple hydraulic system is employed to effect quick coupling of a vehicle to a work implement.

It is a further object of the invention to provide a quick hitch assembly in which the downward load is taken up by means other than the latching means of the quick hitch coupling.

Briefly, in accordance with the present invention, a quick hitch assembly is adapted to engage a vehicle with a work implement having a hitch hook assembly including upper hook means with a pair of downwardly facing recesses and lower hook means with a pair of upwardly facing recesses. The quick hitch assembly includes an upper frame member which is adapted to be positioned in the downwardly facing recesses of the upper hook means. When the upper frame member is received in the upper hook means, a pair of latching members are positioned above the upwardly facing recesses of the lower hook means. The coupling of the quick hitch assembly to the work implement is effected by means for extending the quick hitch assembly to engage the latching members with the upwardly facing recesses of the lower hook means. Since the latching members and the upwardly facing recesses are of complementary shape, the latching members being wedge-shaped with an inward taper on at least one side, firm latching is effected. The vertical movement of each of the latching members is guided by a guide housing. In order to divert downward load stresses from the latching members, a lower shoulder of the guide housing engages a block within each of the upwardly facing recesses.

In one embodiment, the means for extending the quick hitch assembly is manually actuated. In this embodiment, the upper frame member supports a swivel member which is pivoted thereon. The swivel actuates the latching members through an over-center linkage. Holes are provided in the swivel member to receive a lever by means of which the swivel member is manually pivoted to extend the linkage and drive the latching members into the complementary upwardly facing recesses of the lower hook means. In order to retain the linkage in its extended or retracted condition, a pair of side frame members are provided with holes to receive a pin which is positioned closely adjacent a link of the linkage so that the linkage cannot move from its extended or retracted condition.

In a second embodiment of the invention, a simple vertically positioned hydraulic cylinder is employed for extending the quick hitch assemblies to engage the latching members in the upwardly facing recesses.

These and other features, objects, and advantages of the invention will become more readily apparent upon consideration of the following detailed description of preferred embodiments of the invention with reference to the accompanying drawings.

DETAILED DESCRIPTION OF THE PREFERRED EMBODIMENTS

Figure 1:
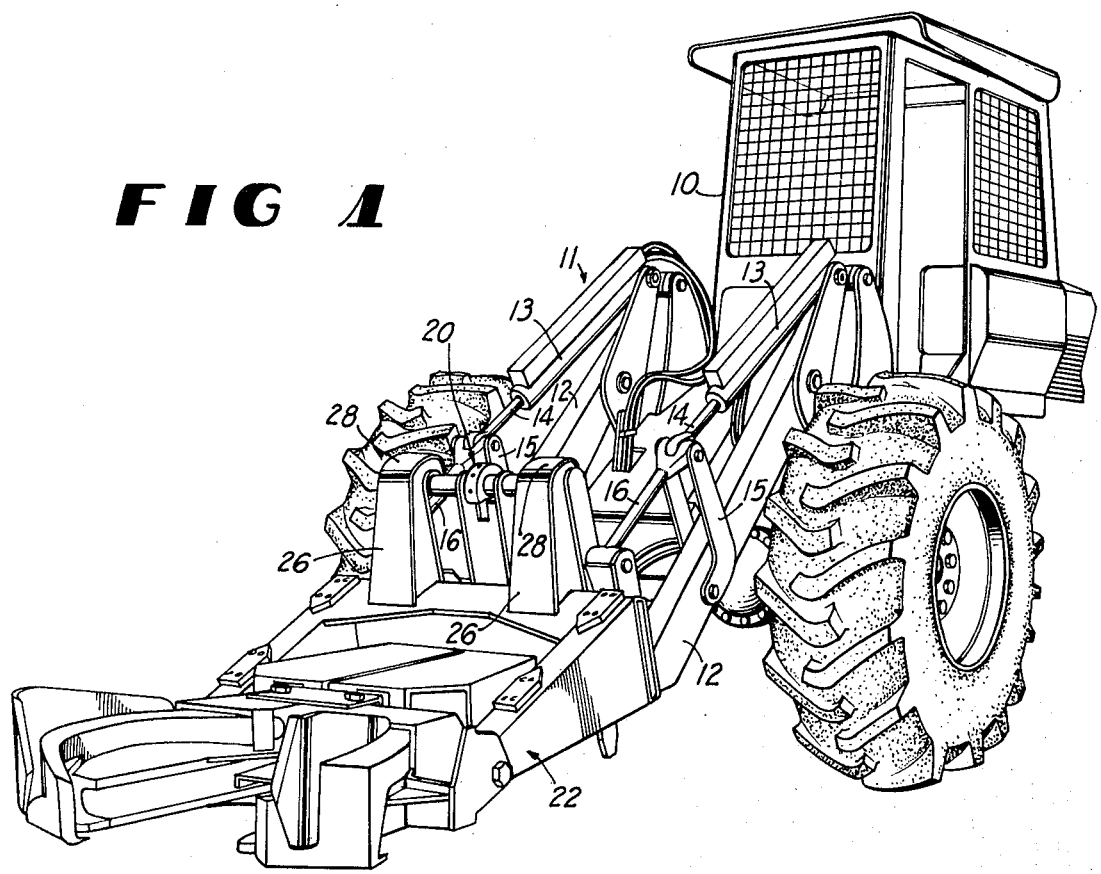
FIG. 1 is a perspective view of a tractor coupled to a work implement by means of a first embodiment of a quick hitch assembly of the present invention.
Figure 2:
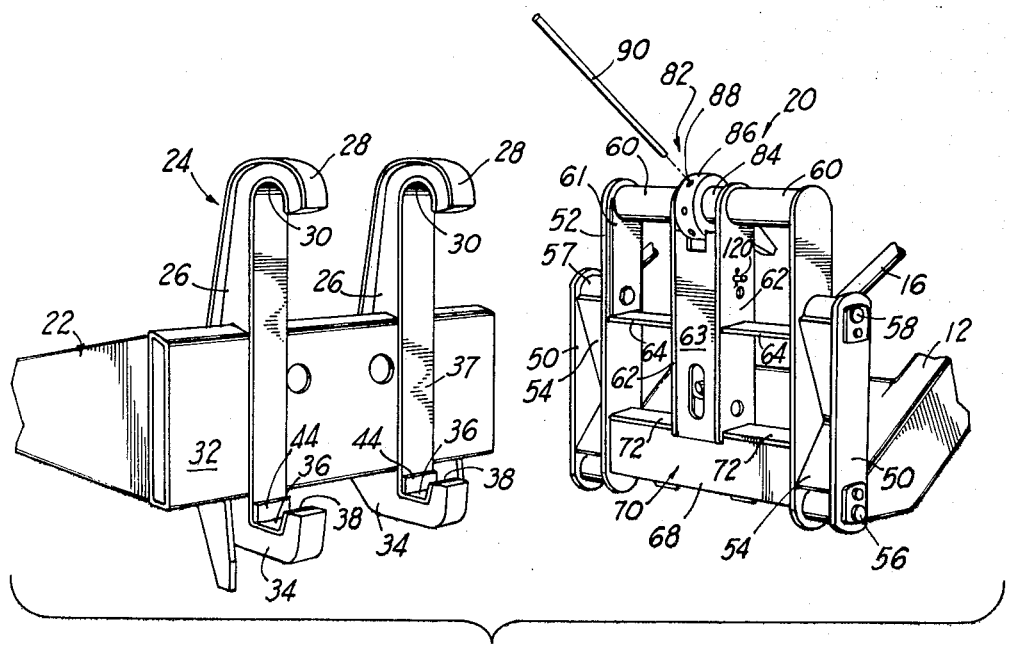
FIG. 2 is a partial perspective view showing the quick hitch assembly of FIG. 1 disengaged from the work implement.
Figure 3:
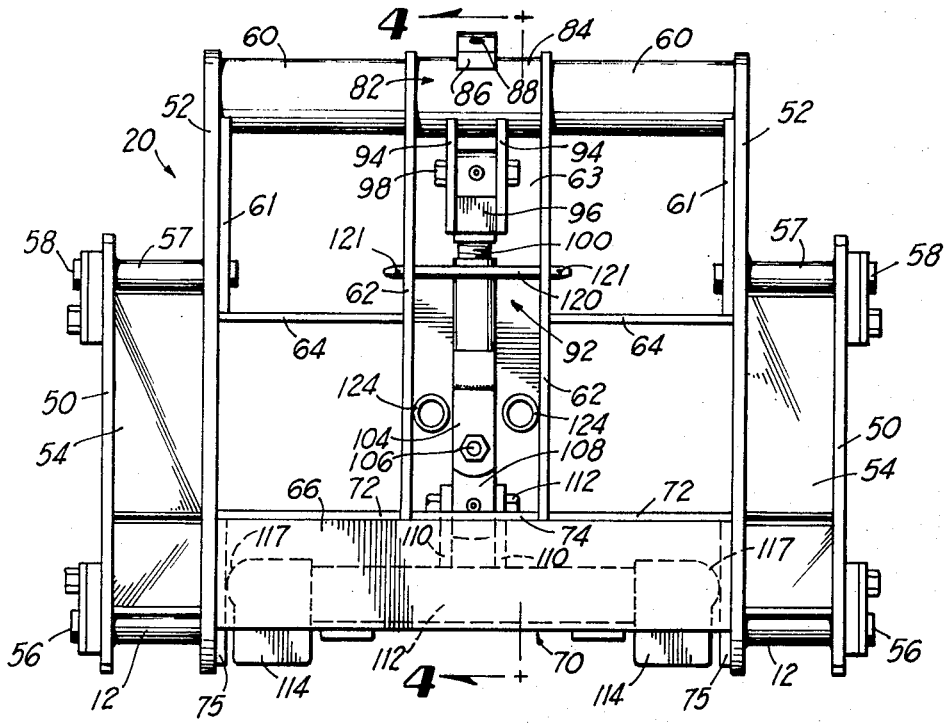
FIG. 3 is an elevation view of the quick hitch assembly of FIG. 1 as seen from the tractor.

Referring to FIG. 1, a tractor 10 is provided with power manipulation means 11 including, as is customary in the art, a pair of lower arms 12, a pair of hydraulic cylinders 13, a pair of piston rod extensions 14, linkage arms 15, and linkage arms 16. As is best seen in FIG. 2, arms 16 and 12 are connected to a quick hitch assembly 20 which, as will be presently described, serves to attach tractor 10 to a work implement 22. Although in this illustration a shear of the type manufactured by Rome Industries, the assignee of the present application, is shown, any work implement of the type which is customarily attached to a tractor or the like may be employed, including snow plows, earth moving blades, buckets, or the like.

The rearward facing side of implement 22 is provided with a hitch hook assembly 24 which includes a pair of upright members 26. The top ends of upright members 26 are curved at 28 to provide a pair of downwardly facing hook recesses 30. Similarly, a pair of members 34, which are curved to provide a pair of upwardly facing recesses 36 depend from the bottom surface of the rear wall 32 of implement 22. A pair of generally C-shaped plate members 37 are welded to members 26 and 34 and rear wall 32 and form the surfaces of recesses 30 and 36. As will be most readily apparent from FIGS. 4 and 5, in which implement 22 and hitch hook assembly 24 are shown in phantom line, recesses 36 are of special shape. Each recess 36 has an inclined front wall 38, a flat bottom wall 40, and a flat vertical rear wall 42. In the corner between bottom wall 40 and rear wall 42 is positioned a load block 44 which, as will be presently described, will serve to take up the downward load impressed through the quick hitch assembly.

Turning now to FIGS. 2, 3, 4, and 5, it will be noted that quick hitch assembly 20 includes a pair of outer vertical side plates 50 which are spaced outwardly from a pair of vertical frame members 52. Spacers 54 of generally V-shaped configuration maintain respective plates 50 and 52 in spaced parallel relationship. It will be noted that the lower ends of arms 12 are pivoted to the lower ends of side plates 50 and frame members 52 by means of respective pivot pins 56 extending therebetween. The ends of link arms 16 are connected by any suitable means, such as welding to pivot sleeves 57 which are mounted on pivot pins 58 extending between respective frame members 50 and 52.

A top tubular frame member 60 extends upright frame members 52, being welded at its ends to these frame members. Additional support for the ends of top frame member 60 is provided by a pair of plates 61 which are bolted to the inside surfaces of upright frame members 52. Top frame member 60 extends through a pair of inner upright frame members 62, suitable holes being provided through these frame members for this purpose. It will be noted that upright frame members 62 form a three-sided housing with a vertical back wall 63 extending therebetween for the means for extending quick hitch assembly 20 to be presently described. Spacers 64 extended between respective upright frame members 52 and 62 to help maintain them in spaced parallel relationship. A pair of vertical plates 66 and 68 extend between upright frame members 52 in spaced parallel relation to form a guide housing 70, the purpose of which will be presently described. Upright frame member 62 rests on vertical plates 66 and 68, and the top side of guide housing 70 is closed by a pair of horizontal plates 72 extending between respective frame members 52 and 62 and by a central horizontal plate 74 extending between the pair of upright frame members 62. In order to permit the means for extending quick hitch assembly 20 to extend therethrough, a hole 73 is provided through plate 74. A pair of end guide plates 75 are secured to the inner surfaces of frame members 52 and extend between plates 66 and 68. It will be noted that a lower shoulder 69 of plate 68 may be brought to rest on load bearing block 44 in each recess 36.

An important feature of the quick hitch assembly 20 is a latching assembly 80 which serves as the means for extending the quick hitch assembly 20 whenever it is desired to latch the quick hitch assembly in its attached condition. For this purpose, a pivot or swivel assembly 82 is provided and includes a sleeve 84 mounted for pivotal movement about top frame member 60, being located between upright frame members 62. A C-shaped actuating block 88 is secured to the outer surface of sleeve 84 and includes a number of holes 88 extending radially thereof. These holes are adapted to receive an actuating lever 90 (see FIG. 2) having an outer diameter which is slightly smaller than the diameter of holes 88. Lever 90 may be inserted in one of the holes 88 so that a workman may pivot swivel assembly 82 about top frame member 60. As will be presently explained, this will serve to extend quick hitch assembly 20 or to retract it.

Rotation of pivot assembly 82 serves to actuate an over-center linkage 92 which is positioned generally within the three-sided housing formed by frame members 62 and wall 63. For this purpose, a pair of spaced parallel ears 94, which form a first link of linkage 92, are integrally connected to sleeve 84 as by welding, and receive therebetween a block 96 which is pivotally connected thereto by a pivot pin 98 extending between ears 94. Block 96 has a projecting threaded stud 100 which is threadably received in the upper end of a tubular member 102. The lower end of tubular member 102 is mounted to swivel within a housing 103 which is welded to a pair of spaced ears 104 which form a yoke for pivotal connection to the next link of the linkage. A number of holes 105 are provided at spaced points around tubular member 102 so that it may be adjusted on threaded stud 100 by inserting a pin therein as will be presently described. It will be noted that block 96, tubular member 102, and ears 104 form a second link of linkage 92. A pivot pin 106 extends between ears 104 for pivotal connection to a block 108, serving as the next link, positioned between ears 104. It will be noted that pivot pin 106 extends in a direction perpendicular to pivot pin 98 and top frame member 60, providing a degree of play in the direction perpendicular to the page. The lower end of block 108 is received between a pair of ears 110, being pivoted thereto by means of a pivot pin 112, which extends in a direction parallel to pivot pin 98 and top frame member 60.

Ears 110, which form the last link of linkage 92, and which extend through hole 73, are welded to a latching bar 112 extending horizontally within guide housing 70. A pair of latching blocks 114 are welded to opposite ends of latching bar 112. It will be noted from FIGS. 4 and 5, that latching blocks 114 have generally flat front and rear surfaces which are guided by guide plates 66 and 68 and a generally flat bottom surface. One corner 116 of latching blocks 114 is, however, inwardly tapered to impart a wedge shape to latching blocks 114.

Figures 4, 5:
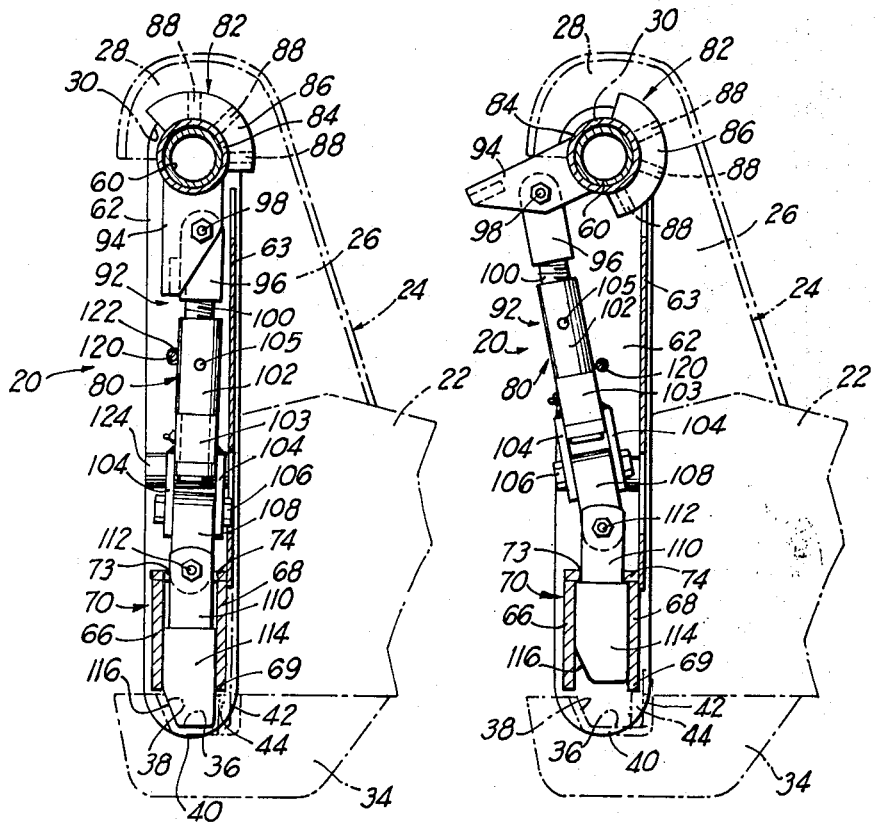
FIG. 4 is a section view taken along the line 4—4 of FIG. 3, showing the quick hitch assembly of the first embodiment of the invention in its extended condition, the work implement being shown in phantom line.
FIG. 5 is a section view corresponding to FIG. 4, showing the quick hitch assembly of the first embodiment of the invention in its retracted condition.

It will be noted that the shape of latching blocks 114 is complementary to the shape of upwardly facing recesses 36 of lower hook members 34, the inclined surfaces 38 and 116 being each displaced approximately 10° from the vertical. The complementary shapes of the blocks and recesses will, as will be presently explained, serve to impart a positive latching action when engaged as shown in FIG. 4. Each latching block 114 is provided with a laterally extending curved protuberance 117 which rides along and is guided by a guide plate 75.

When linkage 92 is fully extended as is shown in FIG. 4, it is desirable to maintain it in the extended position. For this purpose, a retaining pin 120 is provided and may be manually inserted between a pair of aligned holes in upright frame members 62, the length of pin 120 being somewhat greater than the distance between frame plates 62 so that the ends of pin 120 extend beyond plates 62 when it is in place. Holes 121 are provided adjacent the ends of pin 120 (see FIG. 3) and are adapted to receive a pair of cotter pins 122, or the like, being shown in FIG. 4. These serve to retain pin 120 in place. As will be observed from FIG. 4, when pin 120 is in place, linkage 92 is kept in its extended position.

It is also desirable to maintain the linkage in its retracted condition as shown in FIG. 5 when the hitch assembly is moved to another work implement. For this purpose, pin 120 is inserted through another pair of aligned holes in upright frame members 62 in the position shown in FIG. 5, the pin again being retained in place by cotter pins or the like.

In order to prevent excessive lateral play of linkage 92, a pair of guide tubes 124 are welded to the inner surfaces of upright frame plates 62, extending parallel to these frame plates. Guide tubes 124 are positioned closely adjacent each side of linkage 92 to limit lateral play of the linkage.

The operation of the embodiment of FIGS. 1—5, inclusive, will now be described. It will be assumed, at the outset, that hitch hook assembly 24 and quick hitch assembly 20 are separated as shown in FIG. 2 and that linkage 92 is in its retracted position as shown in FIG. 5. Tractor 10 and implement 22 are positioned so that the rear surface of implement 22 faces quick hitch assembly 20. Tractor 10 is then moved toward implement 22 with hydraulic cylinders 13 being operated to tilt the top of quick hitch assembly 20 forward. Top frame member 60 is positioned beneath downwardly facing recesses 30 of top hook members 28. Quick hitch assembly 20 is then raised by actuation of arms 12 of the tractor to become engaged in downwardly facing recesses 30 to lift the implement. This causes the implement to swing backwardly into full engagement with quich hitch assembly 20 as assembly 20 is again moved to a vertical position. At this time, quick hitch assembly 20 will be engaged with hitch hook assembly 24 in the manner shown in FIG. 5. That is, top frame member 60 is engaged in downwardly facing recesses 30 of top hook members 28 and lower shoulder 69 of guide plate 68 of latching guide housing 70 is positioned on load bearing blocks 44. When so positioned, the retracted latching blocks 114 are positioned directly over upwardly facing recesses 36.

In order to prepare the quick hitch assembly for engagement with recesses 36, the workman must remove retaining pin 120 from its position as shown in FIG. 5 so that it will no longer block extension of linkage 92.

It is now necessary to actuate the means 80 for extending quick hitch assembly 20. This is accomplished by a workman inserting one end of lever 90 in one of holes 88 of swivel member 86. The workman then rotates swivel assembly 82 in a counter-clockwise direction, as seen in FIG. 5, to bring swivel assembly 82 to the position shown in FIG. 4. This has the effect of moving link 94 downwardly to the position shown in FIG. 4. This serves to extend over-center linkage 92 to its fully extended position as shown in FIG. 4. As ears 110 are moved downwardly, latchblocks 114 carried thereby, are moved downwardly as well. Latching blocks 114 are guided by guide housing 70 and brought into full, tight engagement with upwardly facing recesses 36 of lower hook members 34. In the event that tubular member 102 is not properly adjusted on threaded stud 100, it may be necessary to adjust member 102 thereon so that blocks 114 become properly engaged tightly within recesses 36. This adjustment is effected by the workman by inserting pin 120 into one of the holes 105 and then turning member 102 until blocks 114 become tightly engaged within recesses 36. Since the shape of blocks 114 and recesses 36 are complementary, a tight fit is effected; and the wedge-like action provides firm latching of quich hitch assembly 20 to hitch hook assembly 24. The workman then secures linkage 92 in its full extended position by inserting retaining pin 120 through the holes provided in frame members 62; and, with the insertion of cotter pins 122, retaining pin is held in place.

When it is desired to disengage the tractor from implement 22, the procedure is reversed. First, the workman removes cotter pins 122 from retaining pin 120 and withdraws retaining pin 120 from the holes in frame plates 62. Lever 90 is again inserted in one of the holes 88 of swivel member 86, and the workman pushes on lever 90 to rotate swivel assembly 82 in the clockwise direction as seen in FIG. 4. This will move swivel member 86 from the position shown in FIG. 4 to the position shown in FIG. 5, bringing link 94 upwardly. This will cause retraction of over-center linkage 92 to the position shown in FIG. 5. Quick hitch assembly 20 is then unlatched from hitch hook assembly 24. The workman then reinserts retaining pin 120 in the position shown in FIG. 5 to prevent inadvertent extension of linkage 92. The manipulating mechanism 11 of tractor 10 is then actuated to lower quick hitch assembly 20 and pivot it so as to withdraw upper frame member 60 from downwardly facing recesses 30. Quick hitch assembly 20 is then retracted from work implement 22, and the work implement is then fully decoupled from the tractor.

Figure 6:
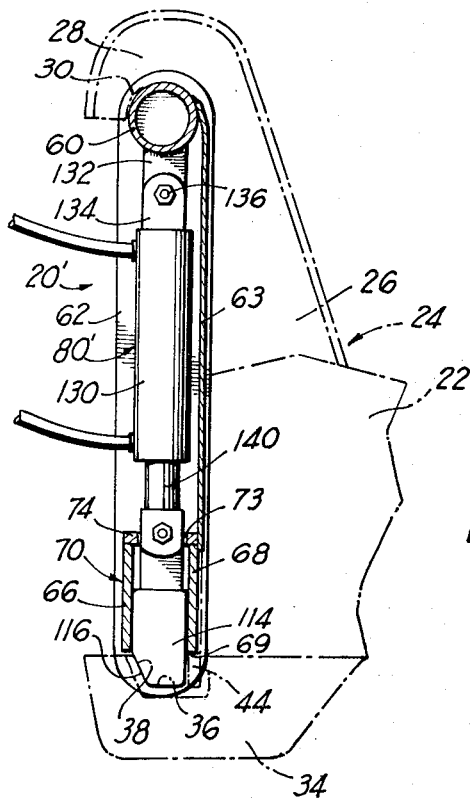
FIG. 6 is a section view corresponding to the section view of FIG. 4, showing a second embodiment of a quick hitch assembly of the invention in its fully extended condition.
Figure 7:
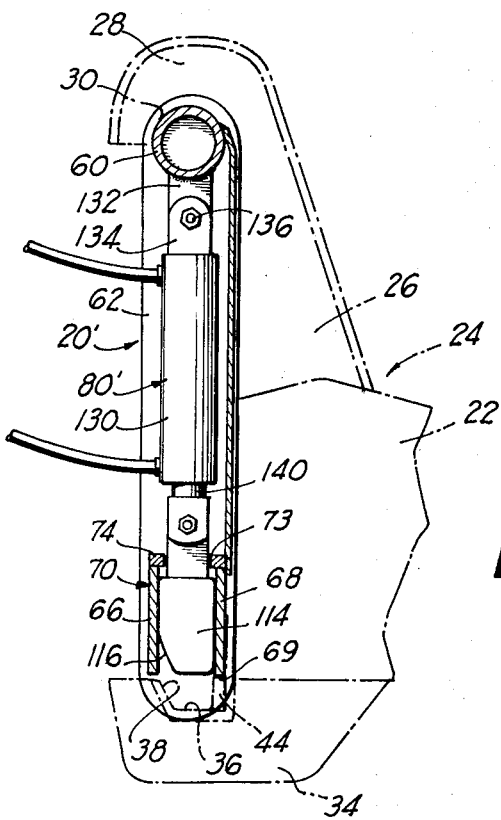
FIG. 7 is a view corresponding to the view of FIG. 5, showing the quick hitch assembly of the second embodiment of the invention in its retracted condition.

A second embodiment of the invention, employing hydraulic rather than manual means for extending the quick hitch assembly is shown in FIGS. 6 and 7. Since the only difference between the embodiment of FIGS. 6 and 7 and the embodiment of FIGS. 1-5, inclusive, is the means for extending the quick hitch assembly, the same reference numerals will be employed in FIGS. 6 and 7 as were used in FIGS. 4 and 5 to designate identical parts.

As before, hitch hook assembly 24 is shown in phantom line and comprises a pair of upper hook members 28 and lower hook members 34, upper hook member 28 having downwardly facing recesses 30 and lower hook members 34 having upwardly facing recesses 36. Quick hitch assembly 20 is shown in full line and includes a pair of latching blocks 114. These blocks are guided in a guide housing 70 formed by plates 66 and 68 and are moved by means 80' from a retracted position as shown in FIG. 7 to an extended position as shown in FIG. 6 to become engaged in complementary recesses 36 for latching quick hitch assembly 20' to implement 22. It will be noted, also, that the lower shoulder 69 of guide plate 68 rests on load bearing blocks 44 which are located within recesses 36. In this way, downward load applied through quick hitch assembly 20' is taken up on blocks 44 and is not applied through latching blocks 114.

In the embodiment of FIGS. 6 and 7, the means 80' for extending quick hitch assembly 20' is positioned within the three-sided housing formed by frame members 62 and wall 63 and comprises an hydraulic cylinder 130 which is connected at its upper end to a pair of depending ears 132 welded to the bottom side of upper guide member 60 by means of a plate 134 extending therebetween and a bolt 136. A piston rod 140 extends from the lower end of hydraulic cylinder 130 through hole 73 and is connected to a latching bar similar to latching bar 112 of FIG. 3 (not shown in FIGS. 6 and 7) and through this latching bar to latching blocks 114 which are connected on opposite ends thereof as is the case in FIG. 3.

The operation of the embodiments of FIGS. 6 and 7 is generally similar to that of the embodiment of FIGS. 1–5 inclusive. Upper frame member 60 is engaged in downwardly facing recesses 30 by tipping the upper end of quick hitch assembly 20' forwardly by manipulation of manipulation means 11 of tractor 10 to bring upper frame member 60 beneath downwardly facing recesses 30 of hitch hook assembly 24. Manipulation means 11 is actuated to raise quick hitch assembly 20' to engage upper frame member 60 in downwardly facing recesses 30 lifting the rear end of work implements 22 upwardly as quick hitch assembly 20' is moved again to a straight vertical position. This causes the rear end of implement 22 to swing toward quick hitch assembly 20' bringing lower hooks 34 and their upwardly facing recesses 36 directly beneath latching blocks 114 with lower shoulder 69 of guide plate 68 brought to rest upon load bearing blocks 44. The operator of the tractor then actuates hydraulic cylinder 80' causing piston rod 140 to extend to the position shown in FIG. 6. In this position, latching blocks 114 are wedged within complementary upwardly facing recesses 36 firmly to latch quick hitch assembly 80' to implement 22.

To disengage implement 22 from quick hitch assembly 20', the operations are reversed. The operator actuates hydraulic cylinder 80' to retract piston rod 140 upwardly to the position shown in FIG. 7. Hitch hook assembly 24 is then unlatched from quick hitch assembly 20' and the latter is easily disengaged from hitch hook assembly 24 by appropriate manipulation by manipulation means 11 of tractor 10.

While preferred embodiments of the invention have been shown and described, it will be readily apparent to those skilled in the art that changes can be made without departing from the principles and spirit of the invention, the scope of which is defined in the appended claims.

The invention claimed is:

1. A quick hitch assembly for attaching a vehicle to a work implement having a hitch hook assembly including upper hook means with a downwardly facing recess and lower hook means with an upwardly facing recess, comprising:
    an upper frame member adapted to be positioned in said downwardly facing recess of said upper hook means;
    a latching member adapted to be positioned above said upwardly facing recess of said lower hook means when said upper frame member is positioned in said downwardly facing recess; an means for extending said latching member to engage said latching member with said upwardly facing recess, said means for extending comprising a first link pivoted on said upper frame member and a second link extending between and pivotally connected to said first link and said latching member.

2. A quick hitch assembly according to claim 1, wherein the shape of said upwardly facing recess is complementary to the shape of said latching member.

3. A quick hitch assembly according to claim 2, wherein said latching member is wedge shaped.

4. A quick hitch assembly according to claim 2, wherein said latching member is inwardly tapered on at least one side.

5. A quick hitch assembly according to claim 1, further comprising a guide housing for said latching member.

6. A quick hitch assembly according to claim 1, further comprising retaining means to retain said links in extended condition.

7. A quick hitch assembly according to claim 6, wherein said quick hitch assembly further comprises a pair of upright frame members on opposite sides of said links and said retaining means comprises a pin extending between said upright frame members, said pin being closely adjacent said second link to prevent said second link from pivoting from said extended condition.

8. A quick hitch assembly for attaching a vehicle to a work implement having a hitch hook assembly including upper hook means with a downwardly facing recess and lower hook means with an upwardly facing recess, comprising:
    an upper frame member adapted to be positioned in said downwardly facing recess of said upper hook means;
    a latching member adapted to be positioned above said upwardly facing recess of said lower hook means when said upper frame member is positioned in said downwardly facing recess, said upwardly facing recess being provided with block means, a guide housing for said latching member and said guide housing including a shoulder which is engaged with said block means whereby downward load is taken up by said block means; and
    means for extending said quick hitch assembly to engage said latching member with said upwardly facing recess.

9. A quick hitch assembly according to claim 8, wherein said means for extending said quick hitch assembly comprises linkage means.

10. A quick hitch assembly according to claim 9, wherein said linkage means includes means for manually extending said linkage means.

11. A quick hitch assembly according to claim 8, wherein said means for extending said quick hitch assembly comprises hydraulic means.

12. A quick hitch assembly for attaching a vehicle to a work implement having a hitch hook assembly including upper hook means with a downwardly facing recess and lower hook means with an upwardly facing recess, comprising:
    an upper frame member adapted to be positioned in said downwardly facing recess of said upper hook means;
    a latching member adapted to be positioned above said upwardly facing recess of said lower hook means when said upper frame member is positioned in said downwardly facing recess; and means for extending said quick hitch assembly to engage said latching member with said upwardly facing recess, said means for extending said quick hitch assembly comprising linkage means, said linkage means including swivel means pivotally mounted on said upper frame member, said swivel means having holes for receiving a lever whereby said swivel means may be manually pivoted to extend said linkage means.

13. A quick hitch assembly according to claim 12, further comprising retaining means to retain said linkage means in its retracted condition.

14. A quick hitch assembly according to claim 13, wherein said quick hitch assembly further comprises a pair of upright frame members on opposite sides of said linkage means and said retaining means comprises a pin extending between said upright frame members, said pin being closely adjacent a link of said linkage means to prevent said link from pivoting from said retracted condition.

* * * * *